Sept. 19, 1944.        K. O. VARTIA         2,358,672
BRIDGE STABILIZING MEANS
Filed Aug. 22, 1942
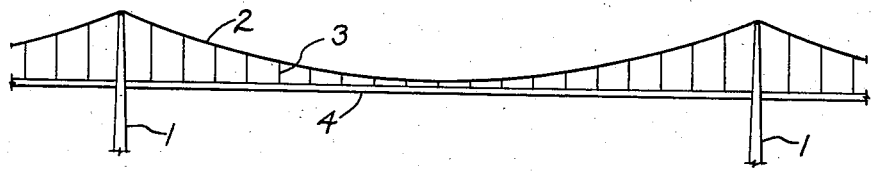
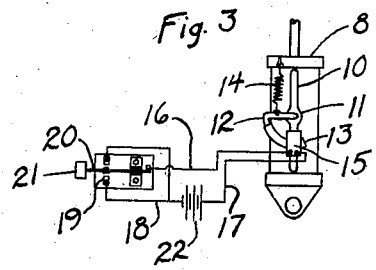
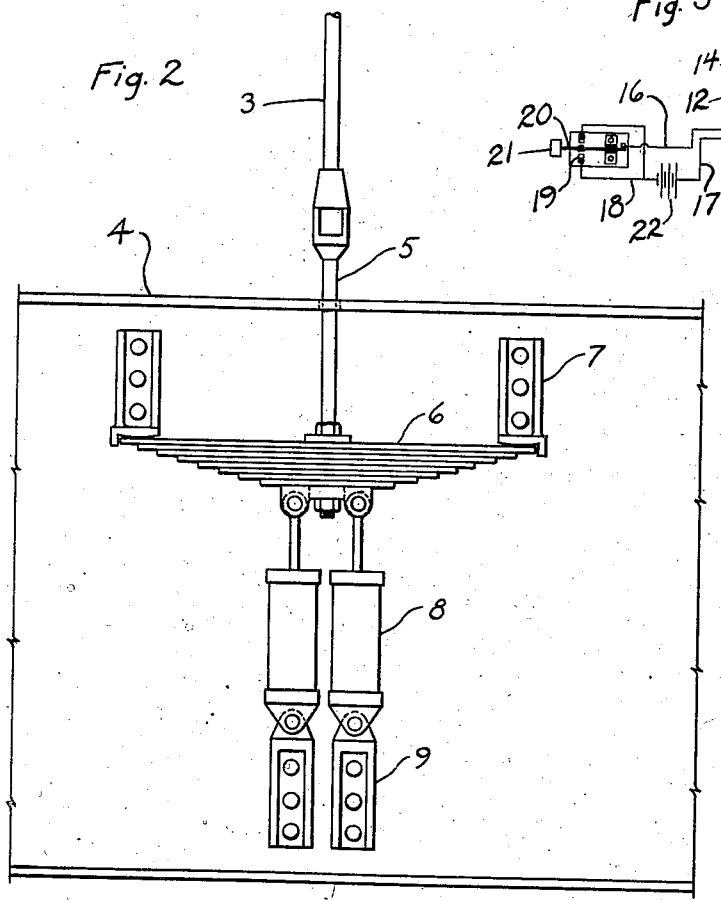
Karl O. Vartia
INVENTOR.

Patented Sept. 19, 1944

2,358,672

UNITED STATES PATENT OFFICE 2,358,672

BRIDGE STABILIZING MEANS

Karl O. Vartia, Tucumcari, N. Mex.

Application August 22, 1942, Serial No. 455,748

6 Claims. (Cl. 14—18)

My invention relates to means for rendering suspension bridges less susceptible to wind energized oscillations, which in the past have destroyed many bridges of this type.

This wind originated phenomena may be due either to unstable airfoil action of the bridge floor by which a steady wind force is transformed in part into pulsating vertical forces, or to actual pulsating wind forces, or both. Whatever the cause, these pulsations deliver energy into the bridge structure. If the bridge be sufficiently rigid, vibrations of only small and unimportant magnitude can result. On the other hand if the bridge be relatively flexible, the storing of energy takes the form of vibrations of large amplitude. As long as the deflections of the cable and roadway structure remain within the elastic limits of the structural materials, no structural harm results. However, in this case no energy is lost through structural action and the vibrations continue as long as the input of energy equals the energy lost in air resistance. If the air resistance losses do not previously reach equilibrium with the energy input, the vibration amplitudes increase until energy loss begins to take place through so-called structural damping. If this occurs as slipping in riveted joints, it must soon become inadequate as the joints become loosened and frictional losses decrease. If it occurs as inelastic action in the stressed material of the bridge, that is, as stresses beyond the elastic limit, failure is but a matter of time.

It is an object of my invention to control the aforesaid vibrations and prevent the above described condition of incipient failure, by means of damping devices introduced into the bridge suspension for the purpose of dissipating energy.

Fig. 1 is an elevation of a typical suspension bridge. Fig. 2 is an elevation in enlarged detail of a portion of roadway stiffening girder showing an energy dissipating arrangement connected into the bridge suspension. Fig. 3 is an elevation combined with a wiring diagram of an automatic control arrangement connected to the damping device of the energy dissipating arrangement.

Similar numbers indicate similar parts in the several views. The towers 1 support a main cable 2 to which are connected a series of suspender cables 3 which in turn are ordinarily connected directly to the stiffening girder 4 of the bridge roadway. Preferably at this point, I introduce the spring 6 which bears against the seats 7. The rod 5 serves as a clamping means to hold the leaves of spring 6 together and provides a socket for attaching suspender cable 3. The hydraulic damping devices 8 are connected at one end to spring 6 and at the other to brackets 9 rigidly attached to the girder 4. The damping devices 8 may be a common form comprising a piston dividing the barrel of the damper into two chambers and having fixed or thermostatically controlled orifices connecting the opposing chambers for fluid passage as the piston is caused to move by force applied to the piston rod. The arrangement shown in Fig. 3 is a diagrammatic illustration of means for attaining a further control of the damping means 8. An external fluid passage 10 connecting the opposing chambers of the damper 8 includes a valve portion 11 having an arm 12 which closes and opens the valve. Attached to arm 12 is an armature 13 which passes through the solenoid coil 15. Connected to coil 15 are the wires 16 and 17, which in this case are shown leading to an automatic switch means and to the battery or other electrical energizing means 22. The automatic switch comprises a spring plate 20 to which is connected the wire 16. The plate 20 is mounted on insulated supports. Adjacent to the plate on either side are the contacts 19 which are connected to the battery 22 by wires 18. On the end of spring plate 20 is mounted the mass 21. I contemplate that the switch device will be mounted at any desired point on the bridge where it will be subject to the oscillations whose action will be most effective in providing the desired control of damper 8. As the switch mounting is accelerated in either direction the inertia of mass 21 pulls plate 20 against one or the other of the contacts 19 and thus closes the circuit energizing solenoid 15. This draws armature 13 to the right and thus operates the arm 12 to either open or close valve 11 as may be desired. The spring 14 returns arm 12 to its original position when coil 15 is de-energized.

This automatic inertia control may be arranged to close fluid passage 10 as the force in suspender cable 3 is reaching a maximum thus causing more load to be transmitted through the damper and less through spring 6. On this basis spring 6 could be made of lighter design or its deflections could be limited. On the other hand, if the control means were arranged to open the fluid passage 10 as the suspender load is nearing a maximum or minimum, a greater deflection of spring 6 would occur at the peaks of the stress cycle, and the return to normal position against the hydraulic resisting means would distribute the dissipation of energy more evenly throughout the stress cycle.

I also contemplate that the circuit to solenoid coil 15 may be subject to manual switch control as from some central point where an operator might vary the action of the damping devices to meet varying wind conditions or varying action of the bridge. A more precise control of the damper action could be obtained, if desirable, by a plurality of solenoid controlled valves or by a valve shaft geared to a reversible electric motor. Obviously other alternative control arrangements will occur to those skilled in the art. The purpose of the manual control would be, in part at least, to enable experimental determination of the most effective degree of hydraulic control, in view of the difficulty of exact analysis of the forces involved.

Considering in brief, now, the operation of the energy dissipating suspension, it will be clear that as the stress in suspender cable 3 varies with vertical oscillations of the stiffening girder 4, the spring 6 will flex and the pistons of dampers 8 will be actuated to cause fluid transfer between the previously mentioned opposing chambers of the dampers. The energy used in causing fluid transfer is largely lost in fluid friction and the heat generated thereby is dissipated through the metal of the damper to the surrounding air.

Obviously the form of the spring and of the damping means may be widely varied for varying conditions and I contemplate the alternative use of coil springs or rubber springs or combinations of springs. Likewise friction dampers or electro-mechanical dampers might be substituted for the hydraulic dampers. I wish to note further that the leaf spring 6 might be used without additional damping means since some friction between the leaves, even though they be lubricated, is inherent in the operation of a leaf spring and with a suitable design such friction damping might be utilized to effect the purpose of this invention.

I contemplate that as many energy dissipating units as may be required will be installed at the suspension points throughout the length of the bridge.

I claim:

1. In a suspension bridge, a main cable, a suspender cable attached to said main cable, spring means connected to said suspender cable and supporting a roadway stiffening girder, said spring means being operative to permit relative movement between said suspender cable and said stiffening girder in response to any variation in the transmitted load and damping means operatively connected to said supporting cable and to said stiffening girder to yieldingly resist relative movement therebetween.

2. In a suspension bridge, a main supporting cable, a roadway structure, elastic means supporting said roadway structure from said main cable, and damping means connecting said roadway structure and said main cable, said elastic means having a sufficiently low resistance to deflection whereby dynamic increments or decrements of load which are less than the normal live load variations in the supported load of the roadway structure will cause sufficient movement of said roadway structure toward and away from said main cable to functionally operate said damping means.

3. In a suspension bridge comprising supporting towers, a cable structure extending between said towers and a deck structure supported from said cable structure by a series of connecting cables, at least one of said connecting cables including a normally elastic spring element subjected to the load being transmitted by said connecting cable whereby any variation in said load will cause deflection of said spring element, and a damping means connected in parallel with said spring element whereby a portion of the energy causing variation in load will be dissipated through non-elastic yielding.

4. In a bridge having spaced primary supports, a carrier structure extending between said primary supports and supported thereby, a deck structure to permit the passage of moving loads along said bridge, normally elastic means supporting said deck structure from said carrier structure so that variations in load will cause relative movement between said structures, and damping means connecting said carrier structure and said deck structure, said elastic means being of sufficiently low modulus of elasticity whereby said relative movement will operatively actuate said damping means.

5. The combination as in claim 4, further characterized by automatic adjusting means for varying the resistance of said damping means to said relative movement, said automatic means being responsive to dynamic variations in load.

6. The combination as in claim 4, further characterized by remote control means for varying the effect of said damping means.

KARL O. VARTIA.